United States Patent
Nelson

(10) Patent No.: US 10,696,538 B2
(45) Date of Patent: Jun. 30, 2020

(54) HORSE TRAINING AID

(71) Applicant: Crystal Lynn Nelson, Watsonville, CA (US)

(72) Inventor: Crystal Lynn Nelson, Watsonville, CA (US)

( * ) Notice: Subject to any disclaimer, the term of this patent is extended or adjusted under 35 U.S.C. 154(b) by 284 days.

(21) Appl. No.: 15/843,348

(22) Filed: Dec. 15, 2017

(65) Prior Publication Data

US 2019/0185314 A1 Jun. 20, 2019

(51) Int. Cl.
*B68B 1/00* (2006.01)
*B68B 1/04* (2006.01)

(52) U.S. Cl.
CPC .......... *B68B 1/00* (2013.01); *B68B 2001/048* (2013.01)

(58) Field of Classification Search
CPC .................. B68B 1/00–04; B68B 2001/048
USPC .................................. 54/16, 35, 57, 70, 71
See application file for complete search history.

(56) References Cited

U.S. PATENT DOCUMENTS

| | | | | |
|---|---|---|---|---|
| 384,460 A * | 6/1888 | Miller | ...................... | B68B 1/04 54/6.1 |
| 851,463 A * | 4/1907 | Williams | .................. | B68B 1/04 54/6.1 |
| 1,572,506 A * | 2/1926 | Renne | ...................... | B68B 1/04 54/1 |
| 3,533,219 A * | 10/1970 | Smith | ...................... | B68B 1/04 54/35 |
| 4,453,371 A * | 6/1984 | Abbott-Davies | ......... | B68B 1/04 54/35 |
| 4,492,073 A * | 1/1985 | Finke | ........................ | B68B 1/04 54/35 |
| 4,495,752 A * | 1/1985 | Simpson | ................... | B68B 1/02 54/24 |
| 4,589,248 A * | 5/1986 | Ruddock | ................... | B68B 1/04 54/24 |
| 4,892,063 A * | 1/1990 | Garrigan | .............. | A01K 27/003 119/795 |
| 5,094,062 A * | 3/1992 | Clark | ........................ | B68B 1/04 54/16 |
| 5,519,986 A * | 5/1996 | Raffit | ........................ | B68B 1/04 54/16 |
| 5,755,185 A | 5/1998 | Gallagher | | |
| 7,249,447 B2 | 7/2007 | Diaz | | |

(Continued)

FOREIGN PATENT DOCUMENTS

DE 102011119275 A1 * 8/2012 ............... B68B 1/04

OTHER PUBLICATIONS

English translation of DC102011119275 (Year: 2012).*

(Continued)

*Primary Examiner* — Magdalena Topolski
*Assistant Examiner* — Marisa V Conlon
(74) *Attorney, Agent, or Firm* — Raymond Sun

(57) ABSTRACT

A horse training aid has a strap and a bungee assembly. The strap has a primary ring attached to a first end, a buckle attached adjacent a second end, and a plurality of secondary rings provided in spaced-apart manner along the strap between the primary ring and the buckle. The bungee assembly has a first bungee cord and a second bungee cord, the two bungee cords connected together at about their central portions by a sleeve with each bungee cord having opposing first and second ends, and each having a clip secured at each of the first and second ends of each bungee cord.

4 Claims, 4 Drawing Sheets

(56) References Cited

U.S. PATENT DOCUMENTS

| | | |
|---|---|---|
| 7,992,368 B2 | 8/2011 | Bentley |
| 8,429,884 B2 | 4/2013 | Roberts |
| 8,752,509 B1 | 6/2014 | Misita |
| 2015/0307342 A1* | 10/2015 | Pierce ...................... B68B 1/00 54/71 |
| 2017/0320722 A1* | 11/2017 | O'Keeffe .................. B68B 1/00 |

OTHER PUBLICATIONS

Publications of FreeJump Collar (p. 1 from https://www.saddlery.biz/freejump-callar-new and p. 2 from http://www.justequine.co.uk/products/riders/freejump-collar-training-aid/ (Year: 2017).*

* cited by examiner

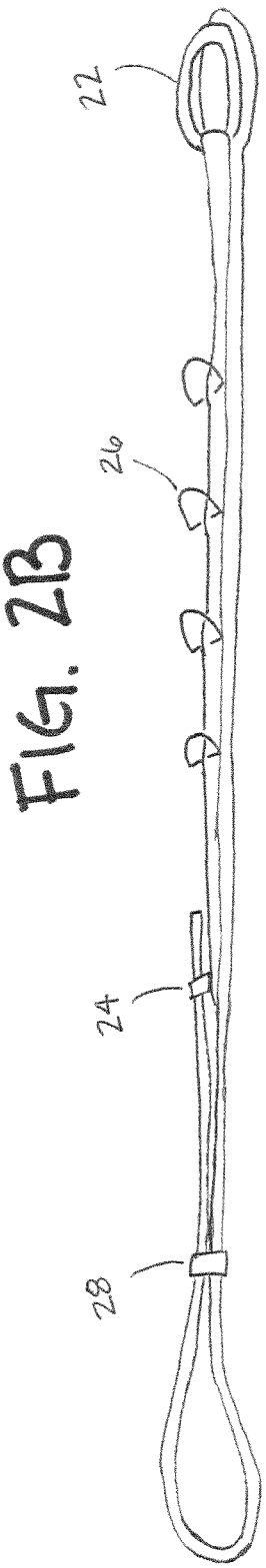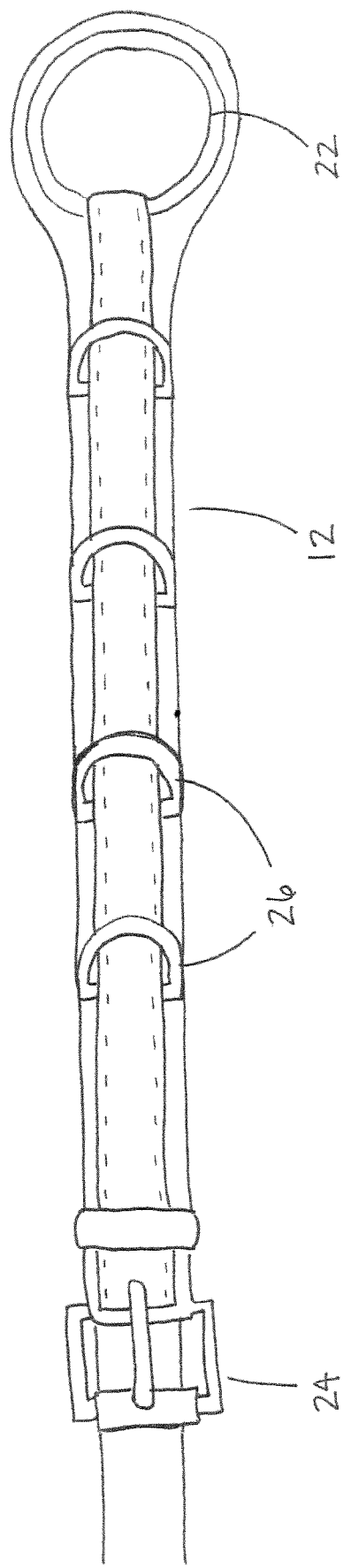

10,696,538 B2

HORSE TRAINING AID

BACKGROUND OF THE INVENTION

1. Field of the Invention

The present invention relates to a horse training aid.

2. Description of the Related Art

There are many existing horse training aids, but they all suffer from one or more drawbacks.

Conventional horse training aids require the trainer to exercise physical strength in controlling the aid to train the horse. Unfortunately, most human beings are not strong enough to resist the duration of training required to attain satisfactory results with conventional training aids.

Many conventional horse training aids are also unadjustable thereby making them either too small or too big depending on the size and stature of the horse. This improper fit also can be harmful to the horse, and will often render the training to less effective.

Many conventional horse training aids also exert improper pressure on some areas of the horse's anatomy, thereby creating improper muscle development or underdevelopment. For example, the de gogue pulls in the chin of the horse from the poll with little to no freedom to move the head and neck, which often frightens horses and can result in serious injury should the horse panic and try to come above the pressure on the poll. As another example, static side reins can trigger stiffening reflex brought about by a rider having a fixed rein contact.

Finally, many conventional horse training aids are not flexible or giving. This forces the horse to compensate its natural balance which impedes correct balancing for optimum horse movement and performance.

Thus, none of the existing conventional horse training aids are adjustable, flexible, easy to use, and requires minimal physical strength from the trainer or rider, while minimizing harm to the horse and allowing the horse to maintain correct balance and form.

SUMMARY OF THE INVENTION

It is an objective of the present invention to provide a horse training aid that is adjustable and interchangeable to fit a horse or pony or other equine animal of any size.

It is another objective of the present to provide a horse training aid that is flexible, easy to use, and requires minimal physical strength from the trainer or rider.

It is another objective of the present to provide a horse training aid that minimizes harm to the horse and allows the horse to maintain correct balance and form, and modifying muscle patterns to build a better equine athlete by activating a greater range of muscles in the horse's body.

To accomplish these objectives, the present invention provides a horse training aid that has a strap and a bungee assembly. The strap has a primary ring attached to a first end, a buckle attached adjacent a second end, and a plurality of secondary rings provided in spaced-apart manner along the strap between the primary ring and the buckle. The bungee assembly has a first bungee cord and a second bungee cord, the two bungee cords connected together at about their central portions by a sleeve, with each bungee cord having opposing first and second ends, and each having a clip secured at each of the first and second ends of each bungee cord.

In use, the sleeve is rested on a mane of the horse, and the clips at the opposing ends of the second bungee cord are secured to a saddle. The strap is positioned between the front legs of the horse. The first bungee cord is extended through a bit of the horse, and the clips at the opposing ends of the first bungee cord are secured to either the primary ring or one of the secondary rings of the strap. The second end of the strap is then secured to a riding girth, or a lunging surcingle.

The present invention encourages correct form from the horse by encouraging the horse to raise its neck, free the shoulders and engage the hocks, which develops the correct muscles for a rounded top-line while requiring minimal physical strength from the trainer or rider. The present invention takes the pressure off the poll and allows free movement of the head and neck while encouraging the lower neck to raise and activate a group of muscles located deep in the horse's neck (the scalenus). This frees the horse's shoulders and engages the hocks, which develops the correct muscles for a rounded top-line while requiring minimal physical strength from the rider/trainer.

BRIEF DESCRIPTION OF THE DRAWINGS

FIG. 2A is a top view of the strap of the training aid of FIG. 1.

FIG. 2B is a side view of the strap of FIG. 2A.

DESCRIPTION OF THE PREFERRED EMBODIMENTS

Figure 1:
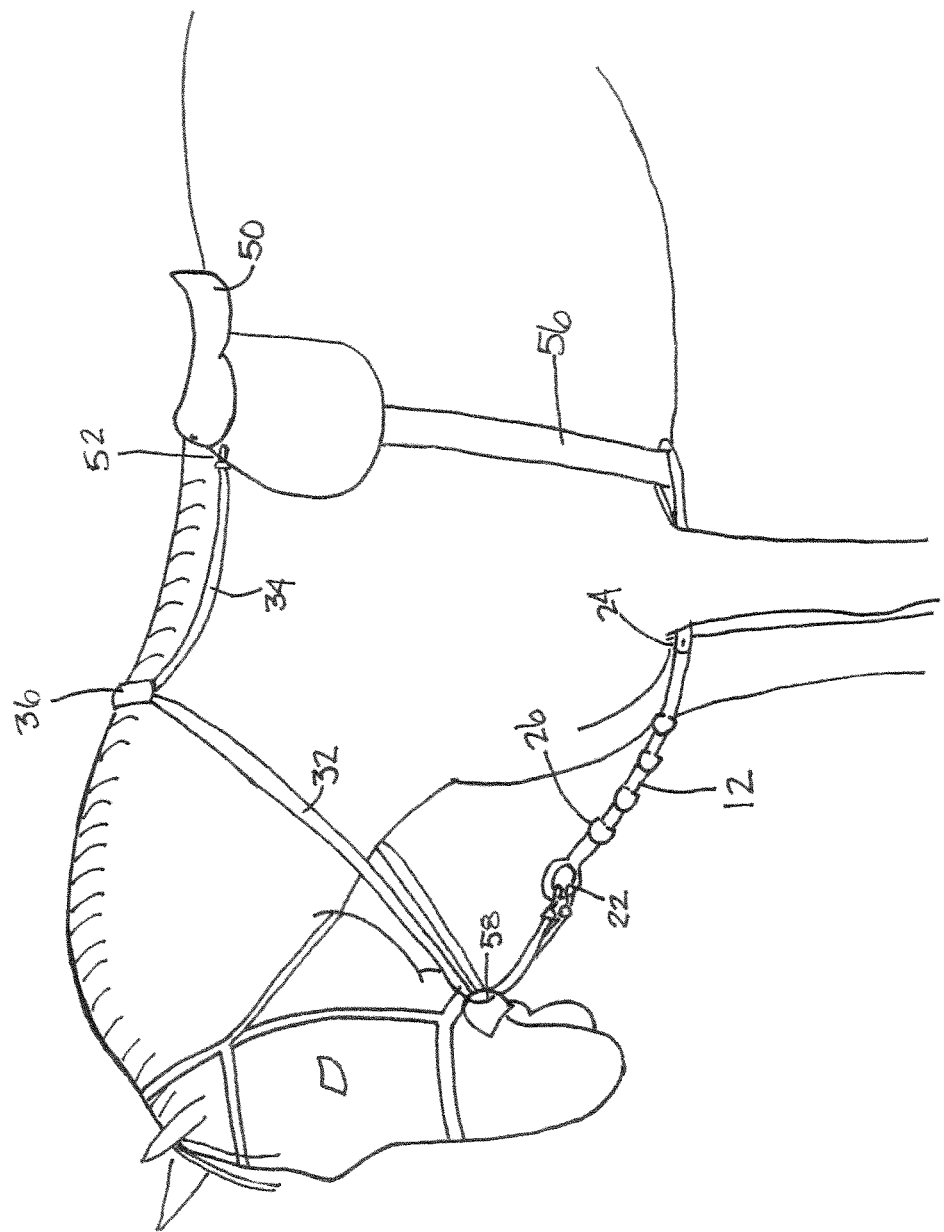
FIG. 1 is a side view of a horse shown with the training aid of the present invention positioned on the horse.
Figure 3:
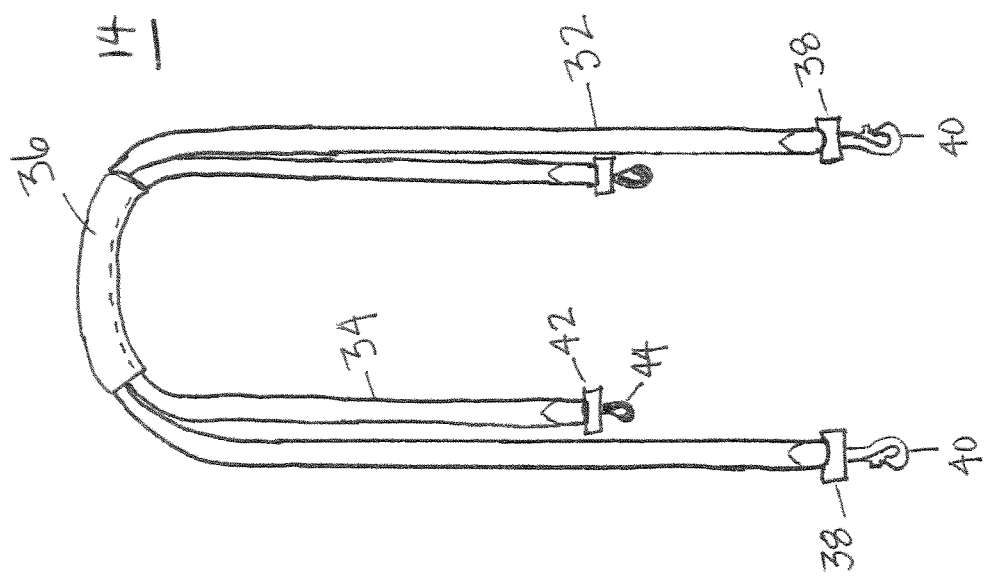
FIG. 3 is a perspective view of the bungee assembly of the training aid of FIG. 1.
Figure 4:
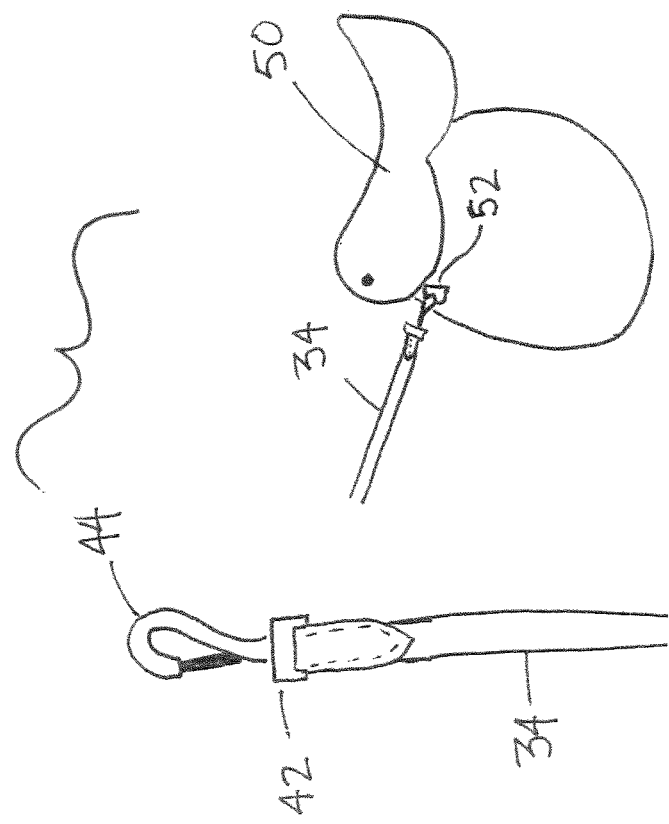
FIG. 4 illustrates how the small clips of the bungee assembly of FIG. 3 are secured to a saddle.
Figure 5:
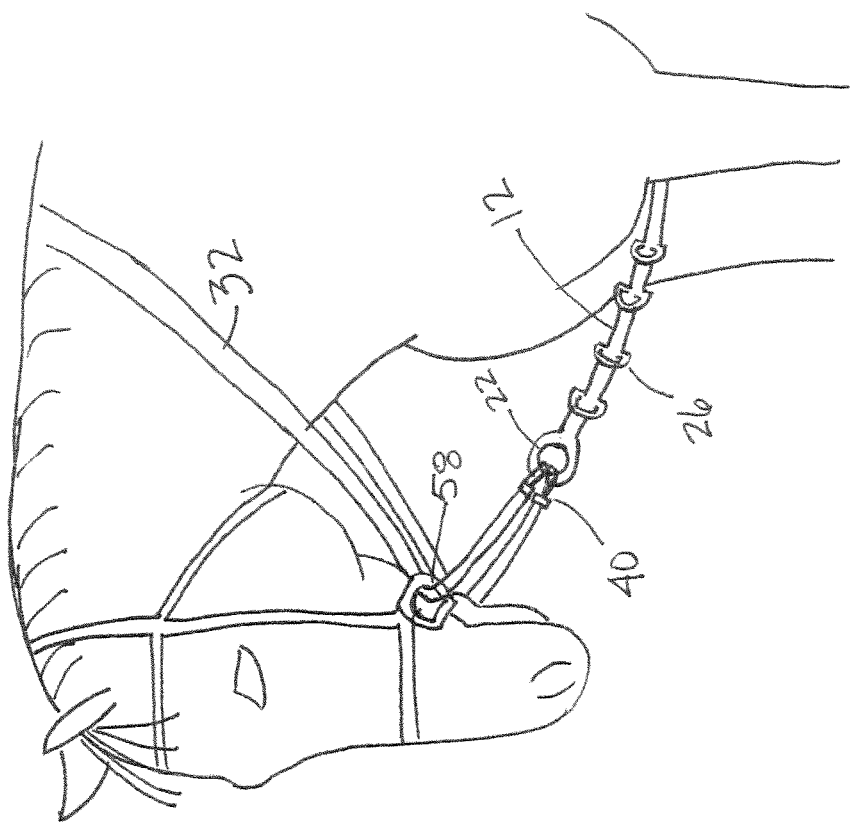
FIG. 5 illustrates how the large clips of the bungee assembly of FIG. 3 are secured to the strap.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides a training aid 10 that encourages correct form for a rounded top-line similar to the form of a jumping horse. Referring to FIGS. 1-6, the training aid 10 has two primary components, a leather strap 12 and a bungee assembly 14. The leather strap 12 is shown in greater detail in FIGS. 2A and 2B, while the bungee assembly 14 is shown in greater detail in FIG. 3.

The leather strap 12 is adapted to be connected between the front legs of a horse with one end connected to a riding girth or a lunging surcingle 56 (hereinafter referred to as "surcingle" but which includes a riding girth), and the other end connected with the bungee assembly 14. The leather strap 12 has one primary ring 22 that is situated at one end of the leather strap 12, and a buckle 24 that is situated at the opposite end of the leather strap 12. A plurality of secondary rings 26 are positioned in spaced-apart manner along the length of the leather strap 12. Although FIG. 2 illustrates four secondary rings 26, it is possible to provide almost any number of secondary rings 26 to provide more flexibility to adjust the training aid when it is positioned on a horse. A keeper 28, which can be made of leather, is provided adjacent the buckle 24 to allow the length of the strap 12 to be adjusted for shorter or longer dimensions, as well as securing the strap 12 for the ultimate fit for each horse. The keeper 28 can be coupled to the bottom of the surcingle 56 that extends from the saddle 50 (see FIG. 1). Punched holes can also be provided along the strap 12 to make it easy to adjust with the buckle 24.

Even though the strap 12 is made of leather, it is also possible to provide the strap 12 in any other material that is appropriate for use with horses.

Figure 6:
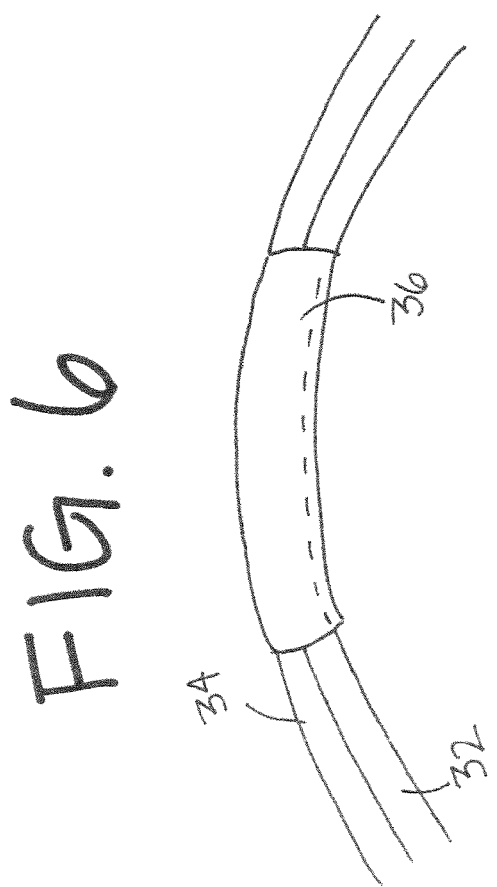
FIG. 6 is an enlarged view of the sleeve that holds the bungee straps together.

The bungee assembly 14 has two bungee cords 32 and 34 that are wrapped or connected together at about their central portions by a sleeve 36. The sleeve 36 can be a leather sleeve that wraps around the two bungee cords 32 and 34, as best shown in FIG. 6. Each opposite end of one bungee cord 32 is provided with a large clip assembly which comprises a buckle 38 that is secured to the end of the bungee cord 32 by a leather binding, and a large clip 40 secured to the corresponding buckle 38. Similarly, each opposite end of the other bungee cord 34 is provided with a small clip assembly which comprises a buckle 42 that is secured to the end of the bungee cord 34 by a leather binding, and a small clip 44 secured to the corresponding buckle 42. The lengths of the bungee cords 32 and 34 are configured to fit on the mane of a horse, and can be varied depending on the size of the horse or pony. For example, longer bungee cords 32 and 34 are provided for use with a larger horse, while shorter bungee cords 32 and 34 are provided for use with a smaller horse.

The sleeve 36 is adapted to rest comfortably on the horse's mane. By resting the sleeve 36 on the mane of the horse, pressure is relieved from the poll (i.e., top of the horse's head) when the nose is encouraged to come in. The sleeve 36 resting on the mane of the horse causes ease of neck flexion right or left, while maintaining a rounded top line. This engages the abs and hind quarters, which is the shape produced while jumping a fence. With the sleeve 36 resting on the neck, it allows the horse to reach its head down instead of having the head being jammed or forced in. There is nothing more damaging to a horse than to hollow its back, drag himself along on the forehand, and not use it hind quarters. This causes the base of the neck to become jammed into the shoulders which means the quarters will not be able to step under the body and the abdominal muscles will not engage to support the spine. The present invention does not employ any backward pressure, so the horse's reaction will be to lower the head, lift its back, and engage its hind legs supporting the spine. As the horse lowers its head, the bit is allowed to slip back into its proper place, which encourages the horse to mobilize its jaw, thereby striking a balance between stretching and exercising the topline willingly.

The small clips 44 are adapted to be removably secured to the D-ring 52 of a conventional saddle 50 to prevent the sleeve 36 from moving up the neck of the horse during training. See FIG. 4. As such, the length of the bungee cord 34 is sized to fit the desired horse as half the length of the bungee cord 34 is supposed to extend between the saddle 50 and the horse's mane.

In addition, the bungee cord 32 extends on either side of the horse's neck and passes through the bit 58. Passing the bungee cord 32 through the bit 58 applies pressure to the corners of the mouth, encouraging the noise to draw inward, allowing for self-carriage and correct balance. The bungee cord 32 then extends to the large clip assemblies where the large clips 40 are adapted to clip one of the rings 22 or 26 of the strap 12. See FIGS. 1 and 5. By providing a plurality of different rings 22 and 26 that are spaced apart along the leather strap 12, different degrees of noise and bit pressure can be selected by the trainer or rider based on the ring 22 or 26 selected by the trainer or rider.

The training aid 10 of the present invention develops the following:

Suppleness through the back: The training aid 10 allows the head to move freely from side to side, while encouraging the lower neck to raise and activate a group of muscles located deep in the horse's neck (the scalenus), along with stretching the higher rhomboideus and trapezius muscles. This frees the horse's shoulders and engages the hocks, which develops and supports muscles along the spine.

Encourages a rounded frame while lunging or during mounted work: The horse can simultaneously raise the base of its neck and stretch the toppling while in work, and the horse punishes or rewards itself instantly by merely shifting the curve of its neck in forward movement.

Develops looseness in the gaits due to greater suppleness in the back: the goal of changing a horse's postural frame is to help the horse become a better athlete in performance. Many riders can activate the horse's large exterior muscles suited for locomotion and neglect the smaller muscles. The training aid 10 targets both large and small muscles which communicate with the nervous system to establish new muscle patterns, strengthening the toppling, hindquarters, and postural muscles such as pelvic stabilizers.

Engages the abs and hind quarters, particularly those needed for jumping: the hind quarters need to step under the belly for the abdominal muscles to engage. If the horse's head is too high, the hind quarters cannot reach under the belly or be engaged. The training aid 10 stops the head from lifting beyond a certain point and allows the lower base of the neck to lift which then naturally engages the hind quarters willingly.

Because of the above benefits, the training aid 10 of the present invention enhances the ease of training for the trainer or rider. This is because the horse works productively against itself so that the trainer or rider is free of resistance from the horse.

While the description above refers to particular embodiments of the present invention, it will be understood that many modifications may be made without departing from the spirit thereof.

What is claimed is:
1. A method of training a horse, comprising the steps of:
    providing a horse training aid, comprising:
        a strap having a first end and a second end, with a primary ring attached to the first end, and a buckle attached adjacent the second end, and further including a plurality of secondary rings provided in spaced-apart manner along the strap between the primary ring and the buckle; and
        a bungee assembly having a first bungee cord and a second bungee cord, the two bungee cords connected together at about their central portions by a sleeve, each bungee cord having opposing first and second ends, each having a clip secured at each of the first and second ends of each bungee cord;
    resting the sleeve on a inane of the horse;
    securing the clips at the opposing ends of the second bungee cord to a saddle;
    positioning the strap between front legs of the horse;
    extending the first bungee cord directly from the sleeve through a bit of the horse and to either the primary ring or one of the secondary rings of the strap;

securing the clips at the opposing ends of the first bungee cord to either the primary ring or one of the secondary rings of the strap; and securing the second end of the strap to a riding girth or a lunging surcingle.

2. The method of claim 1, wherein the clips secured to the opposite ends of the first bungee cords are larger than the clips secured to the opposite ends of the second bungee cord.

3. The method of claim 1, wherein the primary ring is larger than the secondary rings.

4. The method of claim 1, wherein the second bungee cord is shorter than the first bungee cord.

* * * * *